(12) United States Patent
Maruyama

(10) Patent No.: US 11,409,480 B2
(45) Date of Patent: Aug. 9, 2022

(54) PRINT METHOD AND PRINT SYSTEM FOR IMAGE FORMING DEVICE THAT PRINTS RE-ENCRYPTED AND RE-DECRYPTED DATA

(71) Applicant: Oki Electric Industry Co., Ltd., Tokyo (JP)

(72) Inventor: Sumito Maruyama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 66 days.

(21) Appl. No.: 16/570,082

(22) Filed: Sep. 13, 2019

(65) Prior Publication Data

US 2020/0104080 A1 Apr. 2, 2020

(30) Foreign Application Priority Data

Sep. 27, 2018 (JP) .............................. JP2018-182896

(51) Int. Cl.
*G06F 3/12* (2006.01)
(52) U.S. Cl.
CPC .......... *G06F 3/1222* (2013.01); *G06F 3/1238* (2013.01); *G06F 3/1247* (2013.01); *G06F 3/1288* (2013.01); *G06F 3/1239* (2013.01)
(58) Field of Classification Search
CPC .. G06F 21/608; G06F 21/6209; G06F 3/1247; G06F 3/1238; G06F 3/1222; G06F 3/1239
See application file for complete search history.

(56) References Cited

U.S. PATENT DOCUMENTS

| | | | | |
|---|---|---|---|---|
| 2003/0182438 A1* | 9/2003 | Tenenbaum | .......... | G06F 21/608 709/232 |
| 2004/0148335 A1* | 7/2004 | Keeney | .............. | H04N 1/00244 709/201 |
| 2005/0005047 A1* | 1/2005 | Keeney | ................. | G06F 3/1232 710/100 |
| 2005/0243355 A1* | 11/2005 | Foehr | .................... | G06F 3/1245 358/1.13 |
| 2005/0280864 A1* | 12/2005 | Lodwick | ............... | G06F 21/608 358/1.15 |

(Continued)

FOREIGN PATENT DOCUMENTS

JP 2002-259094 A 9/2002
JP 2006-227908 A 8/2006
(Continued)

*Primary Examiner* — Nicholas Pachol
(74) *Attorney, Agent, or Firm* — Muncy, Geissler, Olds & Lowe, P.C.

(57) ABSTRACT

A print method for using an image forming device to print an encrypted file transmitted from a terminal device includes a reception step in which a password of the encrypted file is received, a decryption step in which normal data is generated by decrypting the encrypted file using the password, a restriction setting step in which, based on the normal data, restricted data is generated which is set so as to restrict print processing, a restriction releasing step in which, based on an operation of a user with respect to the image forming device, the restriction of the restricted data is released so that to generate the normal data; and a printing step in which the normal data is printed using the image forming device.

5 Claims, 13 Drawing Sheets

(56) References Cited

U.S. PATENT DOCUMENTS

| | | | |
|---|---|---|---|
| 2006/0221368 A1* | 10/2006 | Higuchi | G06F 3/1204 358/1.13 |
| 2006/0232814 A1* | 10/2006 | Shao | G06F 3/1245 358/1.15 |
| 2010/0110465 A1* | 5/2010 | Ferlitsch | G06F 3/1247 358/1.13 |
| 2011/0055356 A1* | 3/2011 | Nonaka | G06F 21/608 709/219 |
| 2014/0002845 A1* | 1/2014 | Gutnik | G06F 3/1247 358/1.14 |
| 2015/0036191 A1* | 2/2015 | Suzuki | G06F 3/1253 358/1.15 |
| 2016/0011830 A1* | 1/2016 | Asakura | G06F 3/1229 358/1.15 |
| 2019/0026050 A1* | 1/2019 | Pantin | G06F 3/1291 |
| 2019/0042774 A1* | 2/2019 | Claiborne | G06F 3/1292 |

FOREIGN PATENT DOCUMENTS

| | | |
|---|---|---|
| JP | 2008-287526 A | 11/2008 |
| JP | 2009-193118 A | 8/2009 |
| JP | 2014-159123 A | 9/2014 |
| JP | 2017-228971 A | 12/2017 |

* cited by examiner

PRINT METHOD AND PRINT SYSTEM FOR IMAGE FORMING DEVICE THAT PRINTS RE-ENCRYPTED AND RE-DECRYPTED DATA

TECHNICAL FIELD

The present invention relates to a print method and a print system, and is suitably applied, for example, to a print system in which a file stored in a terminal device is printed using a printer.

BACKGROUND

Conventionally, a print system in which a terminal device such as a computer device and a printer are connected via a network has been widely used. Among these, the terminal device creates an application file (hereinafter, simply referred to as a file) by executing an application such as document creation or spreadsheet calculation based on an operation of a user.

In the terminal device, when printing of a file is instructed from a user, by executing a printer driver or the like, the file is converted into print data in a format that can be processed in a printer, and the print data is transmitted to the printer. When the print data is received from the terminal device, by performing print processing based on the print data, the printer can print content (that is, a document, a table, or the like) of the file on a sheet.

In recent years, printing of a file may also be performed from a mobile terminal such as a smartphone or a tablet device. However, even when a mobile terminal has a file created by another computer device or the like, when an application corresponding to the file, a printer driver, or the like cannot be executed, the file cannot be converted into print data and the file cannot be printed.

Therefore, a print system has been proposed in which a conversion server (print server) that performs processing of converting a file into print data is connected to a network, a file is transmitted from a mobile terminal to the conversion server and is converted into print data, and the print data is transmitted to a printer, and thereby, printing of the file is executed (for example, see Patent Document 1).

RELATED ART

[Patent Doc. 1] JP Laid-Open Application Publication 2006-227908

Subject(S) to be Solved

However, in the terminal device, depending on an application, a file may be encrypted by setting a password for a purpose of keeping confidentiality or the like with respect to a third party. That is, a third party who does not know the password cannot view or print the content of the file thus encrypted (hereinafter, this is referred to as an encrypted file).

In the print system, in a case where an encrypted file is printed on an application executed in the terminal device, when a valid password is input, the encrypted file is decrypted and then is converted into print data, and the print data is transmitted to the printer and is printed. Further, in the print system, even in the case where the conversion server is used, when a valid password is input in the mobile terminal and the encrypted file is decrypted, the file is converted into print data in the conversion server, and, based on the print data, printing can be performed in the printer.

That is, the printer of the print system immediately starts print processing when the print data is received regardless of whether or not the file is encrypted, and ejects a sheet (hereinafter, this is referred to as a printed sheet) on which the content of the file has been printed to a sheet ejection tray or the like.

On the other hand, when the print system is installed, for example, in an office or the like which is an environment where a large number of users use a printer located slightly away from terminal devices respectively installed on desks of the users, it takes time from when a user instructs printing of an encrypted file to when the user takes a printed sheet by moving to an immediate vicinity of the printer.

Then, in the print system, there is a possibility that the content of the printed sheet, that is, a matter to be kept confidential, is known by a third party in an immediate vicinity of the printer. That is, in the print system, there is a problem that it is insufficient in keeping confidentiality during printing of a file.

The present invention is accomplished in view of the above problem, and is intended to propose a print method and a print system that can increase confidentiality of a file during printing.

SUMMARY

A print method, disclosed in the application, for using an image forming device to print an encrypted file transmitted from a terminal device includes a reception step in which a password of the encrypted file is received, a decryption step in which normal data is generated by decrypting the encrypted file using the password, a restriction setting step in which, based on the normal data, restricted data is generated which is set so as to restrict print processing, a restriction releasing step in which, based on an operation of a user with respect to the image forming device, the restriction of the restricted data is released so that to generate the normal data; and a printing step in which the normal data is printed using the image forming device.

A print system, disclosed in the application, for using an image forming device to print an encrypted file transmitted from a terminal device includes a first receiving part that receives a password of the encrypted file, a decryption part that generates normal data by decrypting the encrypted file using the password, a restriction setting part that, based on the normal data, generates restricted data that is set so as to restrict print processing, a restriction releasing part that, based on an operation of a user with respect to the image forming device, releases the restriction of the restricted data to generate the normal data, and a print part that causes the image forming device to print the normal data.

According to the present invention, when printing of an encrypted file is instructed, after an operation with respect to an image forming device is performed by a user, printing is performed in the image forming device based on normal data generated by decrypting the encrypted file. As a result, in the present invention, a confidential sheet on which content based on the encrypted file is printed can be immediately collected by the user positioned in an immediate vicinity of the image forming device, and thus can be prevented from being viewed by other users.

With the present invention, a print method and a print system that increases confidentiality of a file during printing are provided.

DETAILED DESCRIPTIONS OF THE PREFERRED EMBODIMENT(S)

In the following, modes for carrying out the invention (hereinafter referred to as embodiments) are described using the drawings.

1. First Embodiment

[1-1. Configuration of Print System]

Figure 1:
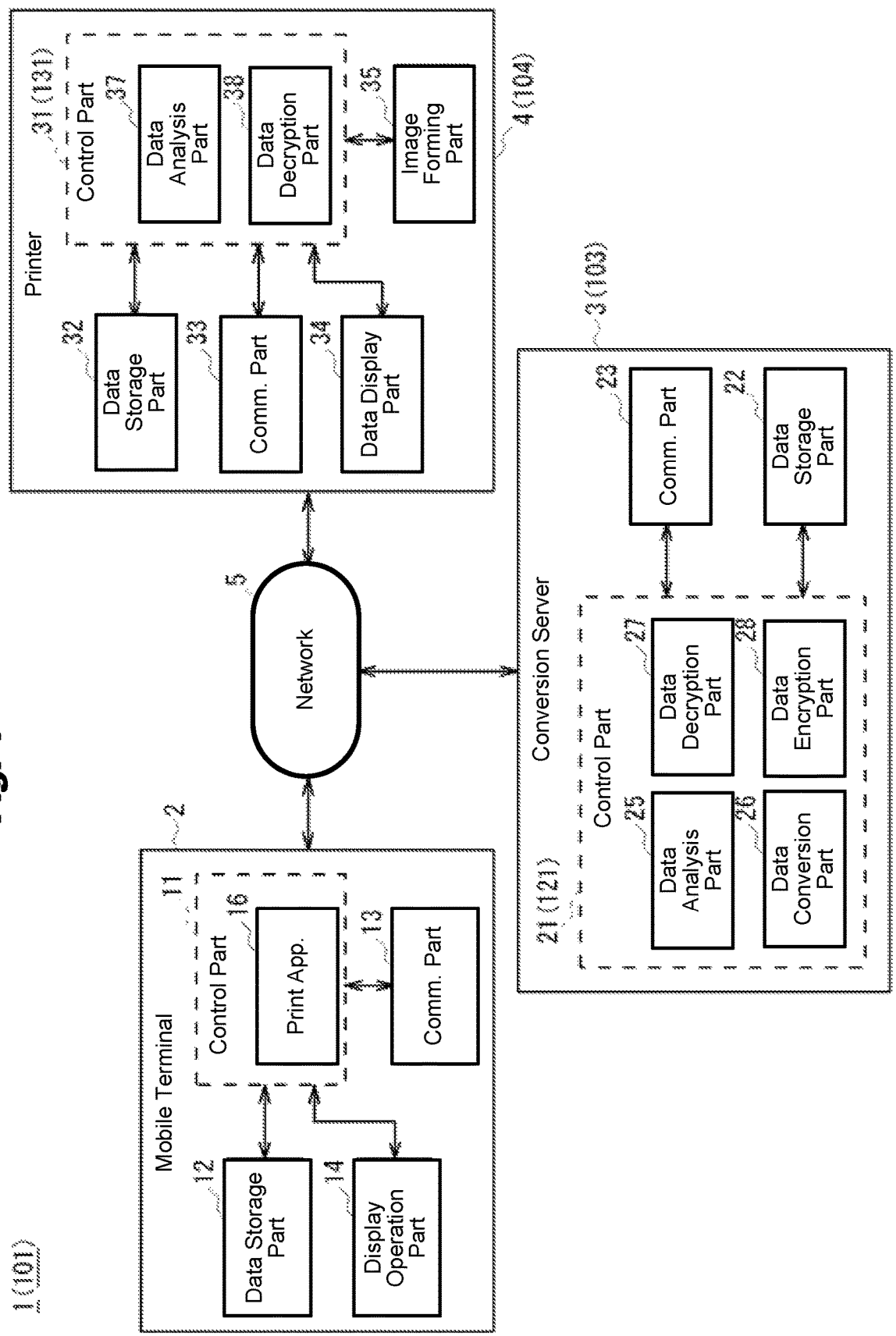
FIG. 1 is a schematic block diagram illustrating an overall configuration of a printing system.

As illustrated in FIG. 1, a print system 1 according to a first embodiment has a configuration in which a mobile terminal 2, a conversion server 3 and a printer 4 are connected to each other via a network 5. The mobile terminal 2 as a terminal device is, for example, a portable information processing device such as a smartphone, and executes various applications based on operation instructions of a user. The mobile terminal 2 has a control part 11, a data storage part 12, a communication part 13, a display operation part 14, and the like.

The control part 11 has therein a CPU (Central Processing Unit), a ROM (Read Only Memory), a RAM (Random Access Memory) and the like which are not illustrated in the drawings. The control part 11 integrally controls the mobile terminal 2 by using the CPU to read out various programs such as an OS (Operating System) and various applications from the ROM and the data storage part 12 and execute the programs using the RAM as a work area.

Further, the control part 11 forms therein a print application 16 (see Print App. In FIG. 1) as a functional block by reading out a printing program from the data storage part 12 and executing the print program. The print application 16 allows a user to select a file stored in the data storage part 12 and thereby allows the file to be printed by the printer 4 (details to be described later).

The data storage part 12 is, for example, a nonvolatile information memory medium such as a flash memory, and stores various programs and various kinds of data. Further, the data storage part 12 stores application files (hereinafter, also simply referred to as files) that are each created by an application such as document creation or spreadsheet calculation in a predetermined computer device.

As the application files, there are files (hereinafter, referred to as normal files or unencrypted files) that have not been subjected to any processing such as encryption and files (hereinafter, referred to as encrypted files) that have each been encrypted using a predetermined password (hereinafter, referred to as an encryption password). Among the files, for the normal files, content of each of the files can be displayed or printed by a general user by executing an application in a computer device (not illustrated in the drawings) or the like. On the other hand, for the encrypted files, content of each of the files can be displayed or printed only when a valid password is input in the application, that is, only when the user knows the valid password.

Further, the mobile terminal 2 cannot execute an application due to restrictions such as processing capacity of the control part 11 or storage capacity of the data storage part 12, and thus cannot open an application file. Further, the mobile terminal 2 also does not have a printer driver corresponding to the printer 4 installed therein, and thus also cannot convert various files into print data in a format suitable for the printer 4.

The communication part 13 as a first transmission part is, for example, a communication interface of a wireless LAN (Local Area Network) conforming to standards such as IEEE (Institute of Electrical and Electronics Engineers) 802.11a/b/g/n/ac or a communication interface of a mobile communication system conforming to standards such as 4G (4th Generation) or the like. By being communicably connected to the network 5, the communication part 13 can transmit or receive various kinds of data to or from the conversion server 3 and the printer 4. Further, the communication part 13 can also perform communication conforming to various wireless communication standards such as Bluetooth (registered trademark), and NFC (Near Field Communication).

The display operation part 14 as a first receiving part is, for example, a touch panel formed by integrating a liquid crystal panel and a touch sensor, and, based on control of the control part 11, can display various display screens to present various kinds of information to a user, and can receive an operation input from the user by displaying a predetermined GUI (Graphical User Interface) screen.

The conversion server 3 as a server device is an information processing device connected to the network 5, and is also referred to as a cloud. The conversion server 3 has a control part 21, a data storage part 22, a communication part 23, and the like.

Similar to the control part 11 of the mobile terminal 2, the control part 21 has a CPU, a ROM, a RAM, and the like which are not illustrated in the drawings, and integrally controls the conversion server 3 by executing various programs. Further, the control part 21 forms therein a data analysis part 25, a data conversion part 26, a data decryption part 27, a data encryption part 28 and the like as functional blocks by reading out a conversion program from the data storage part 22 and executing the conversion program.

The data analysis part 25 determines whether a file is a normal file (that is, an unencrypted file) or an encrypted file. Further, when a file is an encrypted file, the data analysis part 25 queries the mobile terminal 2 for a password for decrypting the encrypted file. The data conversion part 26 executes data conversion processing in which a normal file is converted into print data. The print data is described, for example, using a page description language such as PCL (Printer Control Language), and is data that can be processed by the printer 4, and represents print content such as characters, symbols, or graphics, images and the like.

The data decryption part 27 executes decryption processing in which an encrypted file is decrypted using a supplied password and is converted into a normal file (unencrypted file). The data encryption part 28 as a restriction setting part and a re-encryption part executes encryption processing in which print data is encrypted using a supplied password and is converted into encrypted print data. In the following, print data that has not been encrypted is referred to as normal data, normal print data or unencrypted print data, and print data that has been encrypted is referred to as restricted data or re-encrypted file.

The data storage part 22 is, for example, a nonvolatile information memory medium such as hard disk drive or a flash memory, and stores various programs and various kinds of data. For example, the data storage part 22 can store a normal file, an encrypted file, normal print data and encrypted print data. The communication part 23 as a first reception part, a second transmission part, a third reception part and a fourth transmission part is, for example, a communication interface of a wired LAN conforming to standards such as IEEE 802.3u/ab and the like. By being communicably connected to the network 5, the communication part 23 can transmit or receive various kinds of information to or from the mobile terminal 2 and the printer 4.

The printer 4 as an image forming device is an image forming device that forms an image on a sheet based on image data using an electrophotographic method, and has a control part 31, a data storage part 32, a communication part 33, a display operation part 34, an image forming part 35, and the like.

Similar to the control part 11 of the mobile terminal 2 and the control part 21 of the conversion server 3, the control part 31 has a CPU, a ROM, a RAM, and the like which are not illustrated in the drawings, and integrally controls the printer 4 by executing various programs. Further, the control part 31 forms therein a data analysis part 37, a data decryption part 38, and the like as functional blocks by reading out a print program from the data storage part 32 and executing the print program.

The data analysis part 37 determines whether print data is normal print data (that is, unencrypted print data) or encrypted print data. The data decryption part 38 as a restriction releasing part and a re-decryption part converts encrypted print data into normal print data (unencrypted print data) by decrypting the encrypted print data using a supplied password.

Similar to the data storage part 22 of the conversion server 3, the data storage part 32 is, for example, a nonvolatile information memory medium such as hard disk drive or a flash memory, and stores various programs and various kinds of data. For example, the data storage part 32 can store normal print data and encrypted print data. Similar to the communication part 23 of the conversion server 3, the communication part 33 as a second reception part, a third transmission part and a fourth reception part is, for example, a communication interface of a wired LAN conforming to standards such as IEEE 802.3u/ab and the like. By being communicably connected to the network 5, the communication part 33 can transmit or receive various kinds of information to or from the mobile terminal 2 and the conversion server 3.

The display operation part 34 as a second receiving part is configured to include, for example, a touch panel and an operation button group, the touch panel being formed by integrating a liquid crystal panel and a touch sensor and the operation button group being formed by a combination of numerical buttons, arrow buttons and the like. Among these, the touch panel can display various display screens to present various kinds of information to a user based on control of the control part 31, and can receive an operation input from the user by displaying a predetermined GUI screen. The operation button group receives operation inputs with respect to the operation buttons from the user and notifies the control part 31 of the operation inputs.

The image forming part 35 as a print part has one or more exposure devices, a fuser device, a sheet carrying mechanism, and the like which are not illustrated in the drawings. Among these, each of the exposure devices has an LED (Light Emitting Diode) head, a photosensitive drum, a toner cartridge, and the like, and forms an electrostatic latent image on a surface of the photosensitive drum by causing the LED head to emit light based on normal print data (unencrypted print data) supplied from the control part 31, and forms a toner image by causing toner to be attached to the electrostatic latent image. The image forming part 35 has, for example, four exposure devices that respectively correspond to colors of cyan, magenta, yellow and black. Toner images of the respective colors are respectively formed by the exposure devices and are transferred to a sheer and are fused onto the sheet, and the sheet is ejected to a predetermined sheet ejection tray. Thereby, a color image can be formed on the sheet as a medium, that is, printing can be performed. In the following, a sheet on which an image has been printed is referred to as a printed sheet.

The network 5 is, for example, a wired LAN conforming to standards such as IEEE 802.3u/ab and a wireless LAN conforming to standards such as IEEE 802.11a/b/g/n/ac. The network 5 is configured to include, for example, a hub, a router and the like of a wired LAN, a base station, an antenna and the like of a wireless LAN, and a converter or the like that performs conversion between the wired LAN and the wireless LAN (none of these is illustrated in the drawings).

Further, the print system 1 is installed, for example, in an office where a plurality of workers work, and computer devices and the like (not illustrated in the drawings) that are respectively installed on desks assigned to the workers are also connected to the network 5. In the office, since the plurality of workers share the printer 4, the desks of the workers are slightly away from the printer 4. Therefore, in the office, when the workers use the computer devices to print files and the like using the printer 4, the workers move to near the printer 4 to receive (take out) printed sheets from the sheet ejection tray. In other words, in the office, various people at work can stop by near the printer 4.

[1-2. Printing of File]

In the print system 1, when printing of a file stored in the mobile terminal 2 is instructed, in order to keep confidentiality of the file, the file is converted into print data in the conversion server 3 while decryption processing and encryption processing are appropriately performed, and print processing is performed in the printer 4 based on the print data.

In the following, a print start processing procedure RT1 (FIG. 2) executed by the mobile terminal 2, a conversion processing procedure RT2 (FIG. 3) executed by the conversion server 3, a terminal password input processing procedure RT3 (FIG. 4) executed by the mobile terminal 2, a print data reception processing procedure RT4 (FIG. 5) executed by the printer 4, and an authentication print processing procedure RT5 (FIG. 6) executed by the printer 4 are respectively described. Further, FIG. 7 schematically illustrates flow of various kinds of data (that is, a file, print data, and the like) in a case of an encrypted file in the print system 1.

[1-3. Print Start Processing]

Figure 2:
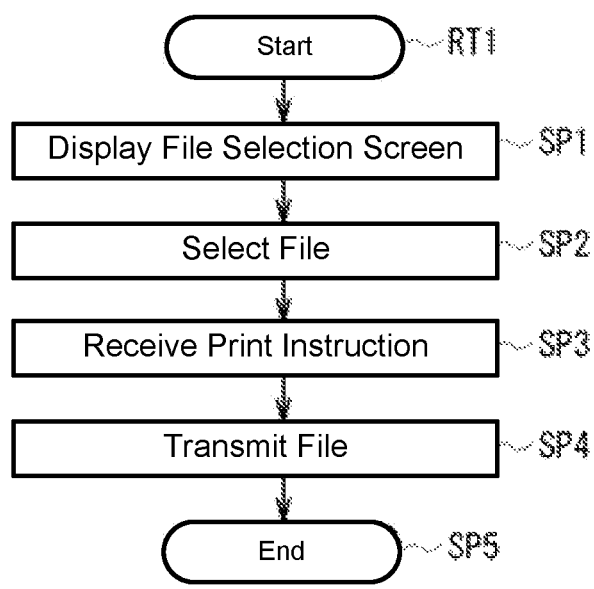
FIG. 2 is a flow diagram illustrating a printing start processing procedure.

First, the print start processing procedure RT1 executed in the mobile terminal 2 is described with reference to the flow diagram of FIG. 2. When start of a print application is instructed by an operation of a user, the control part 11 of the mobile terminal 2 reads out a print program from the data storage part 12 and executes the print program. As a result, the control part 11 forms therein a functional block of a print application 16 (FIG. 1), and starts the print start processing procedure RT1 (FIG. 2) and proceeds to a first step SP1.

Figure 8:
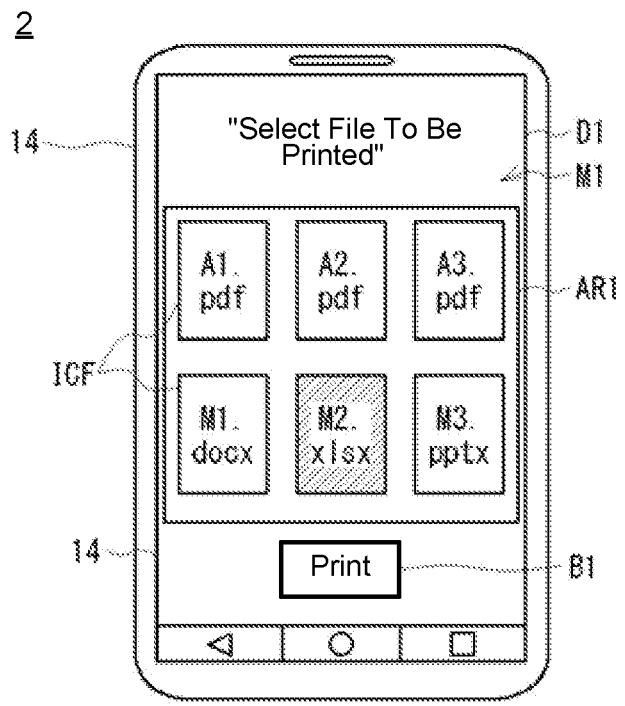
FIG. 8 is a schematic diagram illustrating a file selection screen.

In the step SP1, the control part 11 displays a file selection screen D1 illustrated in FIG. 8 on the display operation part 14 (FIG. 1), and proceeds to a next step SP2. The file selection screen D1 is configured as a so-called GUI, and displays and transmits various kinds of information to a user and receive various operation inputs from the user.

Specifically, in the file selection screen D1, a message M1 such as "Please select a file to be printed." is displayed on an upper side, a file icon arrangement area AR1 occupying a relatively wide central area is formed, and a print button B1 is arranged below the file icon arrangement area AR1.

In the file icon arrangement area AR1, file icons ICF respectively representing files (normal files or encrypted files) stored in the data storage part 12 are aligned. In each of the file icons ICF, a character string representing a file name is superimposingly displayed. In the file selection screen D1, any one of the file icons ICF in the file icon arrangement area AR1 can be selected by a touch operation of a user, and a color of a selected file icon ICF becomes different from the other file icons ICF.

In a state in which any one of the file icons ICF in the file icon arrangement area AR1 has been selected, pressing the print button B1 by a user indicates that printing of the file represented by the file icon ICF has been instructed.

In the step SP2, the control part 11 allows a user to select any one of the file icons ICF in the file icon arrangement area AR1 (FIG. 8) by a touch operation with respect to the display operation part 14 (FIG. 1), and then proceeds to a next step SP3. In FIG. 8, as an example, an "M2.xlsx" file icon ICF at a lower central place is selected and a color thereof is different from other file icons ICF.

In the step SP3, when the print button B1 in the file selection screen D1 (FIG. 8) is touched by the user, the control part 11 proceeds to a next step SP4. This case is regarded by the control part 11 as that a print instruction has been received from the user with respect to the file represented by the file icon ICF selected in the file icon arrangement area AR1.

In the step SP4, the control part 11 reads out from the data storage part 12 the file for which the print instruction has been received, and uses the communication part 13 to transmit the file to the conversion server 3 via the network 5 (FIG. 1), and then proceeds to a next step SP5 to terminate the print start processing procedure RT1. In this case, the control part 11 transmits to the conversion server 3 the selected file as it is regardless of whether the file is a normal file or an encrypted file.

[1-4. Conversion Processing and Terminal Password Input Processing]

Next, the conversion processing procedure RT2 executed in the conversion server 3 (FIG. 1) and the terminal password input processing procedure RT3 executed in the mobile terminal 2 are described. First, the control part 21 of the conversion server 3 (FIG. 1) is activated in advance and then executes a predetermined standby program, and thereby, uses the communication part 23 to wait for a file transmitted from the mobile terminal 2.

When a file is received from the mobile terminal 2, the control part 21 reads out a conversion program from the data storage part 22 and executes the conversion program, and thereby, forms therein functional blocks such a data analysis part 25 (FIG. 1) and then starts the conversion processing procedure RT2 (FIG. 3) and proceeds to a first step SP11.

In the step SP11, the control part 21 stores the file received from the mobile terminal 2 in the data storage part 22 (FIG. 1), and proceeds to a next step SP12. In the step SP12, the control part 21 uses the data analysis part 25 (FIG. 1) to determine whether or not the file is an encrypted file.

When a negative result is obtained here, it means that the file is a normal file and can be converted as it is into print data. In this case, the control part 21 proceeds to a next step SP13. In the step SP13, the control part 21 uses the data conversion part 26 to convert the file which is a normal file into print data (that is, normal print data), and proceeds to a next step SP20.

On the other hand, when a positive result is obtained in the step SP12, it means that the file is encrypted and thus cannot be converted as it is into print data and it is necessary to obtain a valid password in order to decrypt the file. In this case, the control part 21 proceeds to a next step SP14. In the step SP14, the control part 21 uses the communication part 23 to transmit a password request to the mobile terminal 2 via the network 5, and proceeds to a next step SP15.

Figure 4:
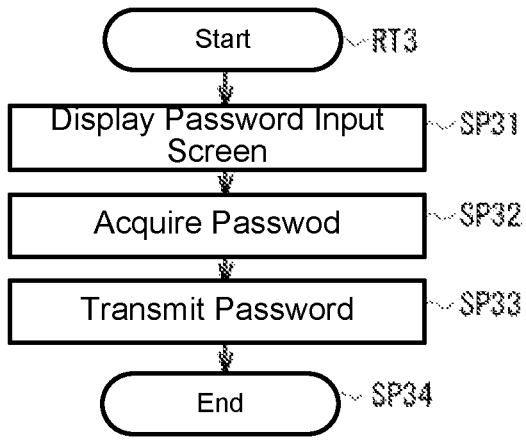
FIG. 4 is a flow diagram illustrating a terminal password input processing procedure.

On the other hand, the control part 11 of the mobile terminal 2 (FIG. 1) uses the print application 16 to wait for a password request from the conversion server 3, and, when the password request is received, starts the terminal password input processing procedure RT3 illustrated in FIG. 4 and proceeds to a step SP31.

Figure 9:
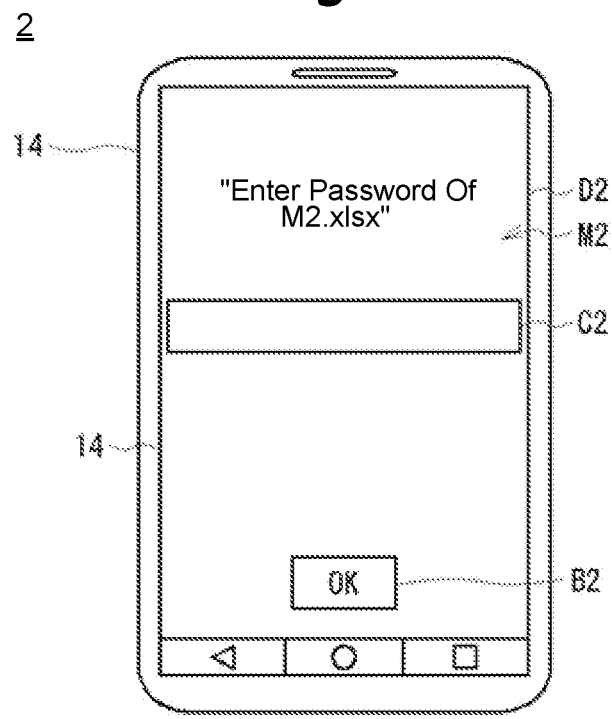
FIG. 9 is a schematic diagram illustrating a terminal password input screen.

In the step SP31, the control part 11 displays a password input screen D2 illustrated in FIG. 9 on the display operation part 14 (FIG. 1), and proceeds to a next step SP32. Similar to the file selection screen D1, the password input screen D2 is configured as a GUI, in which a message M2 such as "Please enter the password of M2.xlsx." is displayed on an upper side, a password input field C2 is arranged below the message M2, and an OK button B2 is arranged on a further lower side.

The password input field C2 is a field for inputting characters, and a password of an encrypted file is input by an operation of a user with respect to the display operation part 14. The OK button B2 is a button for a user to indicate that a password input operation with respect to the password input field C2 has been completed.

In the step SP32, when a user has input a password in the password input field C2 and pressed the OK button B2 in the password input screen D2, the control part 11 acquires the input password and proceeds to a next step SP33. For convenience of description, in the following, the password acquired in this case is referred to as a terminal password. In the step SP33, the control part 11 transmits the acquired terminal password to the conversion server 3 and then proceeds to a next step SP34 to terminate the terminal password input processing procedure RT3.

In response to this, in the step SP15 of the conversion processing procedure RT2 (FIG. 3), the control part 21 of the conversion server 3 (FIG. 1) uses the communication part 23 to receive the terminal password, and proceeds to a next step SP16. In the step SP16, the control part 21 uses the data decryption part 27 (FIG. 1) to convert the encrypted file into a normal file (that is, an unencrypted file) by decrypting the encrypted file using the terminal password, and proceeds to a next step SP17.

In this case, in the conversion server 3, when the encrypted file can be normally decrypted using the terminal password input by the user, the terminal password is authenticated as a valid password. Further, when the encrypted file cannot be decrypted using the terminal password, the control part 21 determines that the terminal password is incorrect and does not match a valid password, and has the user re-input a terminal password by transmitting again a password request to the mobile terminal 2.

Similar to the step SP13, in the step SP17, the control part 21 uses the data conversion part 26 (FIG. 1) to convert the selected file, which has been decrypted into a normal file, into print data, and proceeds to a next step SP18.

In the step SP18, the control part 21 uses the data encryption part 28 (FIG. 1) to encrypt the print data using the terminal password and thereby converts the print data into encrypted print data, and proceeds to a next step SP19. In other words, the control part 21 matches the password (hereinafter also referred to as a re-encryption password) which is used when the print data is encrypted again with the terminal password for decrypting the original encrypted file.

In the step SP19, the control part 21 uses the communication part 23 (FIG. 1) to transmit to the mobile terminal 2 a data conversion notification indicating that the selected file has been converted into print data, and proceeds to the next step SP20. In response to this, when the data conversion notification is received, the mobile terminal 2 displays a predetermined conversion notification screen on the display operation part 14 and thereby allows the user to recognize that the file has been converted into print data in the conversion server and the print data has been transmitted to the printer 4.

In the step SP20, the control part 21 uses the communication part 23 to transmit the generated print data (that is, normal print data or encrypted print data) to the printer 4, and proceeds to a next step SP21. In the step SP21, the control part 21 deletes the selected file stored in the data storage part 22 and then proceeds to a next step SP22 to terminate the conversion processing procedure RT2.

In this way, when a received file is a normal file, the conversion server 3 generates normal print data, and, on the other hand, when the file is an encrypted file, as illustrated in FIG. 7, the conversion server 3 generates encrypted print data by sequentially performing decryption processing, data conversion processing and encryption processing, and the generated print data is transmitted to the printer 4.

[1-5. Print Data Reception Processing]

Next, the print data reception processing procedure RT4 executed in the printer 4 (FIG. 1) is described with reference to the flow diagram of FIG. 5. The control part 31 of the printer 4 (FIG. 1) is activated in advance and then executes a predetermined standby program, and thereby, uses the communication part 33 to wait for print data (that is, normal print data or encrypted print data) transmitted from the conversion server 3.

When print data is received from the conversion server 3, the control part 31 reads out a print data receiving program from the data storage part 32 and executes the print data receiving program, and thereby forms therein the data analysis part 37 and the like (FIG. 1) and starts the print data reception processing procedure RT4 (FIG. 5) and proceeds to a first step SP41. In the step SP41, the control part 31 stores received print data (that is, normal print data or encrypted print data) in the data storage part 32, and proceeds to a next step SP42.

In the step SP42, the control part 31 uses the data analysis part 37 (FIG. 1) to determine whether or not the received print data is encrypted print data. When a negative result is obtained here, it means that the print data is not encrypted and thus can be immediately printed, and means that the file before being converted into the print data is a normal file (unencrypted file) and confidentiality with respect to its content is not required. In this case, the control part 31 proceeds to a next step SP43.

In the step SP43, the control part 31 uses the image forming part 35 to perform print processing based on the print data and thereby prints the content, that is, a document, a table, or the like, of the file on a sheet and ejects the sheet as printed sheet to a predetermined sheet ejection tray (not illustrated in the drawings), and proceeds to a next step SP44. As a result, in the printer 4, the printed sheet is placed in the sheet ejection tray and the content of the printed sheet can be easily viewed by a third party near the printer 4.

In the step SP44, the control part 31 deletes the print data from the data storage part 32 and then proceeds to a next step SP45 to terminate the print data reception processing procedure RT4.

On the other hand, when a positive result is obtained in the step SP42, it means that the print data is encrypted print data and decryption and print processing cannot be performed unless a valid password is obtained, in other words, it means that print processing cannot be started at this point. From another point of view, by being encrypted, the encrypted print data becomes restricted data for which the start of print processing is restricted. In this case, by proceeding to the step SP45, the control part 31 terminates the print data reception processing procedure RT4 without performing print processing based on the encrypted print data while leaving the encrypted print data in the data storage part 32.

In this way, when the received print data is normal print data, the printer 4 immediately performs print processing. On the other hand, when the print data is encrypted print data (that is, restricted data), the printer 4 stores the print data in the data storage part 32 without performing print processing.

[1-6. Authentication Print Processing]

Next, the authentication print processing procedure RT5 executed in the printer 4 (FIG. 1) is described with reference to the flow diagram of FIG. 6. For convenience of description, in the following, a print data set (actually, an encrypted print data set) stored in the data storage part 32 of the printer 4 is referred to as a job.

The control part 31 of the printer 4 (FIG. 1) is activated in advance and then executes a predetermined standby program, and thereby, waits for an operation instruction from a user via the display operation part 34. When a start operation of authentication print processing is performed by performing a predetermined input operation with respect to the display operation part 34 by a user in an immediate vicinity of the printer 4, the control part 31 reads out an authentication print program from the data storage part 32 and executes the authentication print program, and thereby, forms therein the data decryption part 38 (FIG. 1) and starts the authentication print processing procedure RT5 (FIG. 6), and proceeds to a first step SP51.

Figure 10:
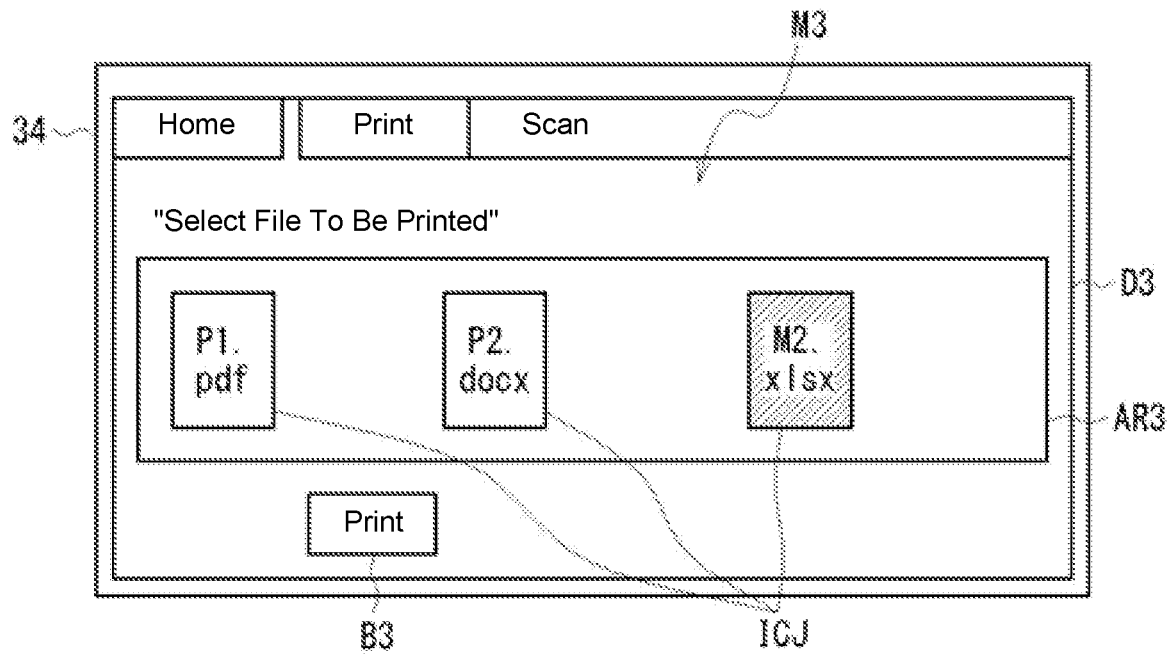
FIG. 10 is a schematic diagram illustrating a job selection screen.

In the step SP51, the control part 31 displays a job selection screen D3 illustrated in FIG. 10 on the touch panel of the display operation part 34, and proceeds to a next step SP52. The job selection screen D3 is configured as a GUI similar to the file selection screen D1 (FIG. 8) and the like, and has a configuration similar to that of the file selection screen D1.

That is, in the job selection screen D3, a message M3 such as "Please select a file to be printed." is displayed on an upper side, a job icon arrangement area AR3 occupying a relatively wide central area is formed, and a print button B3 is arranged below the job icon arrangement area AR3.

The job icon arrangement area AR3 is configured similar to the file icon arrangement area AR1 (FIG. 8), and job icons ICJ respectively representing print data sets (encrypted print data sets, that is, jobs) stored in the data storage part 32 are aligned therein. Character strings representing file names of the files before being converted into the print data sets are respectively superimposingly displayed on the job icons ICJ. In the job selection screen D3, any one of the job icons ICJ in the job icon arrangement area AR3 can be selected by a touch operation of a user, and a color of a selected job icon ICJ becomes different from the other job icons ICJ.

The print button B3 is similar to the print button B1 (FIG. 8). In a state in which any one of the job icons ICJ in the job icon arrangement area AR3 has been selected, pressing the print button B3 by a user indicates that printing of the job (that is, the encrypted print data set) represented by the job icon ICJ has been instructed.

In the step SP52, the control part 31 allows a user to select any one of the job icons ICJ in the job icon arrangement area AR3 (FIG. 10) by performing a touch operation with respect to the display operation part 34 (FIG. 1), and then proceeds to a next step SP53. In FIG. 10, as an example, an "M2.xlsx" job icon ICJ on a right side is selected, and a color thereof is different from other job icons ICJ.

In the step SP53, when the print button B3 in the job selection screen D3 (FIG. 10) is touched by the user, the control part 31 proceeds to a next step SP54. This case is regarded by the control part 31 as that a print instruction has been received from the user with respect to the job (that is, the encrypted print data set) represented by the job icon ICJ selected in the job icon arrangement area AR3.

Figure 11:
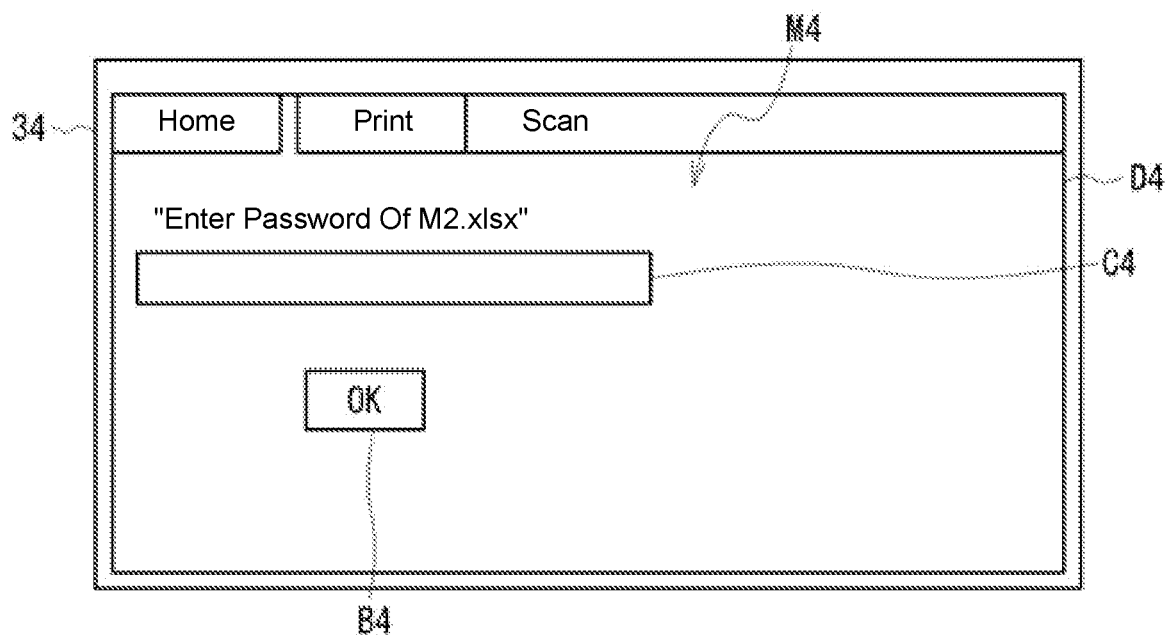
FIG. 11 is a schematic diagram illustrating a printer password input screen.

In the step SP54, the control part 31 displays a password input screen D4 illustrated in FIG. 11 on the display operation part 14 (FIG. 1), and proceeds to a next step SP55. The password input screen D4 has a configuration similar to the password input screen D2 (FIG. 9), in which a message M4 such as "Please enter the password of M2.xlsx." is displayed on an upper side, a password input field C4 is arranged below the message M4, and an OK button B4 is arranged on a further lower side.

Similar to the password input field C2 (FIG. 9), the password entry field C4 is a field for inputting characters, and a password of an encrypted file which is a conversion source of an encrypted print data set is input by an operation of a user with respect to the display operation part 34. Similar to the OK button B2 (FIG. 9), the OK button B4 is a button for a user to indicate that a password input operation with respect to the password input field C4 has been completed.

In the step SP55, when a user has input a password in the password input field C4 and pressed the OK button B4 in the password input screen D4, the control part 31 acquires the input password and proceeds to a next step SP56. For convenience of description, in the following, the password acquired in this case is referred to as a printer password or an image formation password.

In the step SP56, the control part 31 uses the data decryption part 38 (FIG. 1) to decrypt the encrypted print data using the printer password and thereby converts the encrypted print data into normal print data, and proceeds to a next step SP57. In this case, in the printer 4, when the encrypted print data can be normally decrypted using the printer password input by the user, the printer password is authenticated as a valid password, that is, the user who input the printer password is authenticated as the person who instructed the printing of the encrypted file which is the conversion source of the encrypted print data. In other words, in this case, by releasing restriction on print processing, the encrypted print data becomes normal print data (that is, normal data) for which print processing can be executed.

Further, when the encrypted print data cannot be decrypted using the printer password, the control part 31 determines that the printer password is incorrect and does not match a valid password, and has the user to re-input a printer password by displaying again the password input screen D4 (FIG. 11).

Similar to the step SP43 (FIG. 5), in the step SP57, the control part 31 uses the image forming part 35 to perform print processing based on the print data and thereby prints the content, that is, a document, a table, or the like, of the encrypted file on a sheet and ejects the sheet as a printed sheet to a predetermined sheet ejection tray (not illustrated in the drawings), and proceeds to a next step SP58. As a result, although the printed sheet on which the content of the encrypted file has been printed is placed in the sheet ejection tray in the printer 4, the printed sheet is immediately collected by the user who knows the password of the encrypted file and is in a vicinity of the printer 4.

Similar to the step SP44 (FIG. 5), in the step SP58, the control part 31 deletes the print data (that is, the encrypted print data) from the data storage part 32 and then proceeds to a next step SP59 to terminate the authentication print processing procedure RT5.

In this way, in the printer 4, when a job (that is, an encrypted print data set) stored in the data storage part 32 is selected and a valid password is input by a user, the job is decrypted and then printed, and thereby, the user is allowed to immediately collect the printed sheet. For convenience of description, in the following, a series of processing steps from inputting a password by a user to performing print processing in the printer 4 is referred to as authentication print processing.

[1-7. Effects and the Like]

In the above-described configuration, in the print system 1 according to the first embodiment, when printing of a normal file is instructed in the mobile terminal 2, the normal file is converted into print data in the conversion server 3, and print processing based on the print data is performed in the printer 4.

On the other hand, in the print system 1, when printing of an encrypted file is instructed in the mobile terminal 2, as illustrated in FIG. 7, the encrypted file is transmitted to the conversion server 3. The conversion server 3 has the user to input a terminal password on the mobile terminal 2 and acquires the terminal password, and decrypts the encrypted file using the terminal password and converts the decrypted file into print data, and then further encrypts the print data into encrypted print data and transmits the encrypted print data to the printer 4. When a job (encrypted print data) is selected and a printer password is input by operations of a user, the printer 4 decrypts the encrypted print data into normal print data, and then performs print processing.

That is, in the print system 1, when a print instruction of an encrypted file is received in the mobile terminal 2, the user is positioned in an immediate vicinity of the printer 4, and print processing is not started until a printer password is input by operating the display operation part 34, and print processing is started after the printer password is input. Therefore, in the print system 1, a printed sheet on which content of an encrypted file requiring confidentiality has been printed can be immediately collected by a user who has input a valid password, and thus, there is no risk that the printed sheet is viewed by a third party, and the confidentiality of the encrypted file can be reliably maintained.

In other words, in the print system 1, that a valid printer password is input in the printer 4 by a user is set as a print start condition for starting print processing, and print processing is started when the print start condition is satisfied. Therefore, in the print system 1, when the print start condition is satisfied, the user is positioned in an immediate vicinity of the printer 4 and the user knows the password of the encrypted file, which means that there is no problem in keeping confidentiality even when the printed sheet is viewed.

Figure 3:
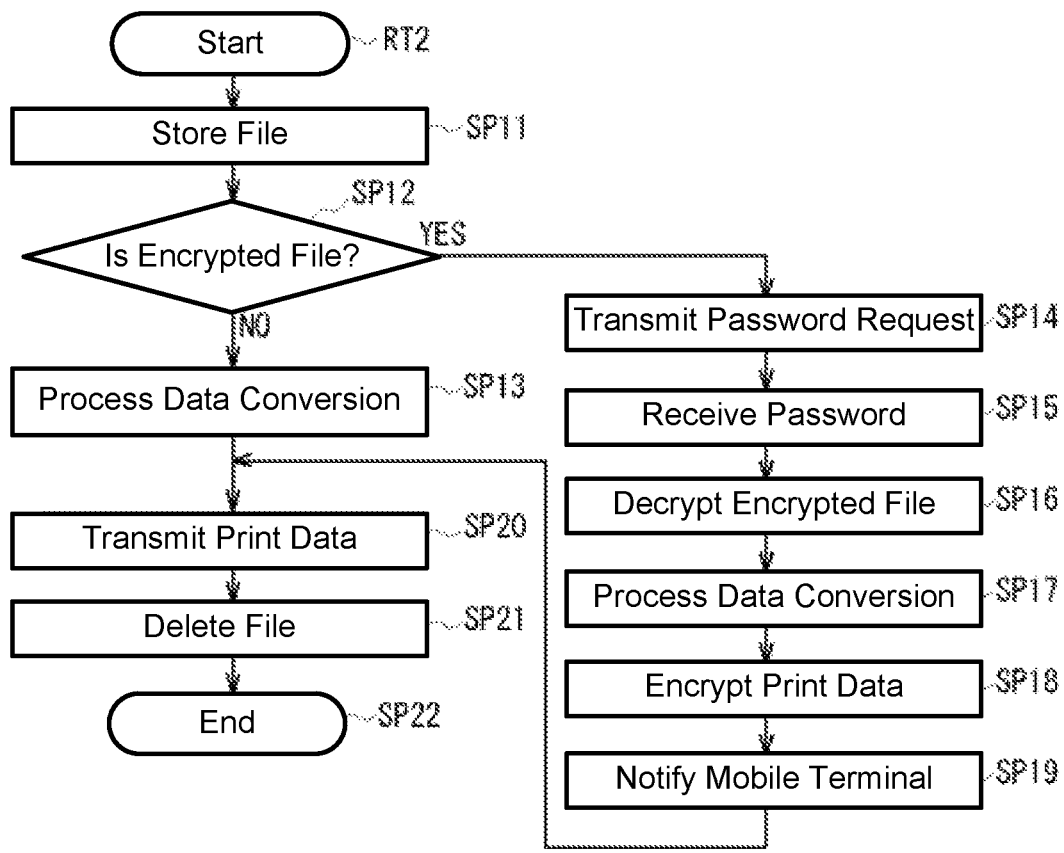
FIG. 3 is a flow diagram illustrating a conversion processing procedure according to a first embodiment.

Further, after converting a file into print data, the conversion server 3 deletes the file from the data storage part 22 (FIG. 3, the step SP21). As a result, in the print system 1, unnecessary files do not remain in the data storage part 22 of the conversion server 3, storage capacity of the data storage part 22 can be kept to a necessary minimum and the files can be prevented from being carelessly leaked out even when there is an unauthorized access or the like.

Figure 5:
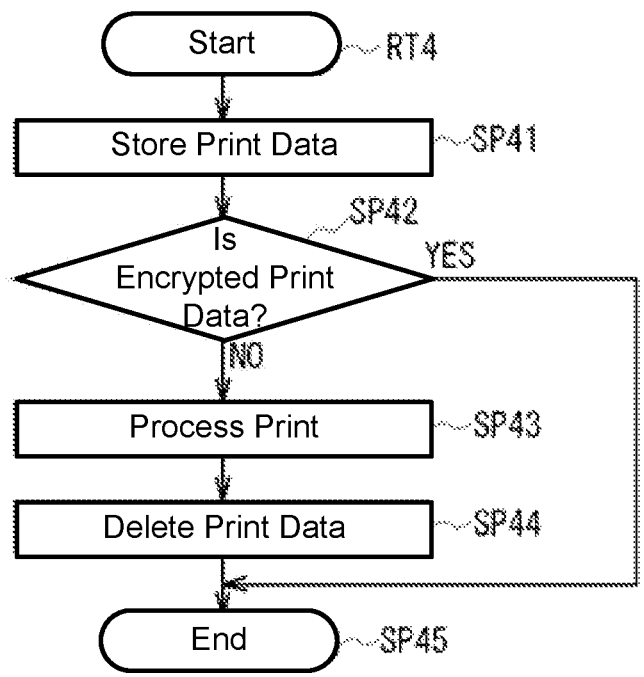
FIG. 5 is a flow diagram illustrating a print data reception processing procedure according to the first embodiment.
Figure 6:
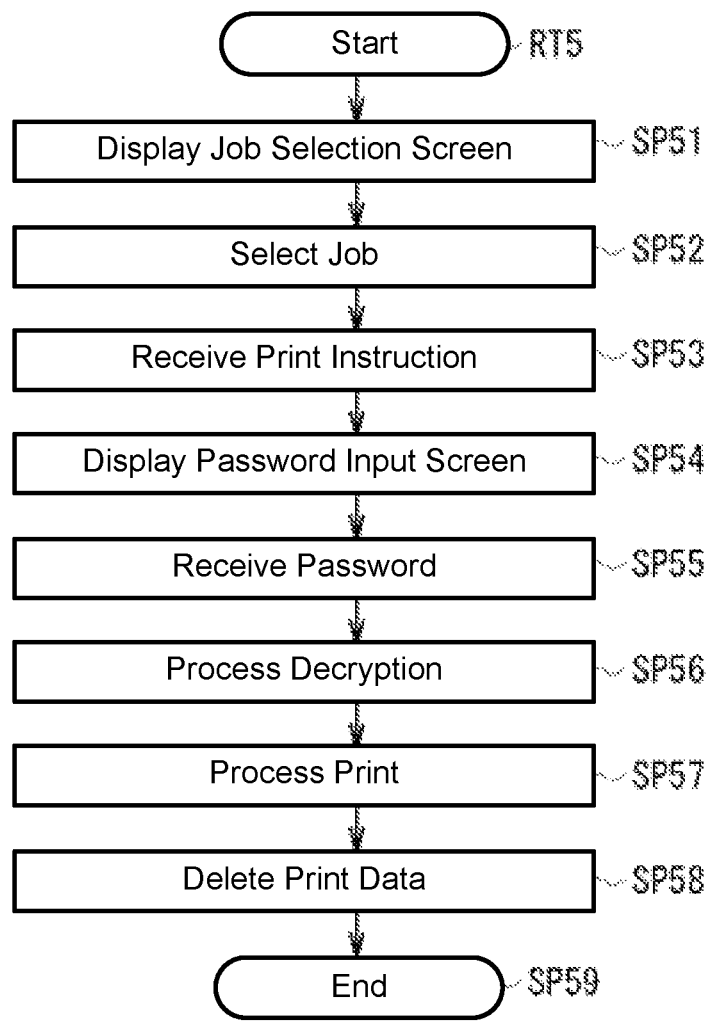
FIG. 6 is a flow diagram illustrating an authentication print processing procedure according to the first embodiment.
Figure 7:
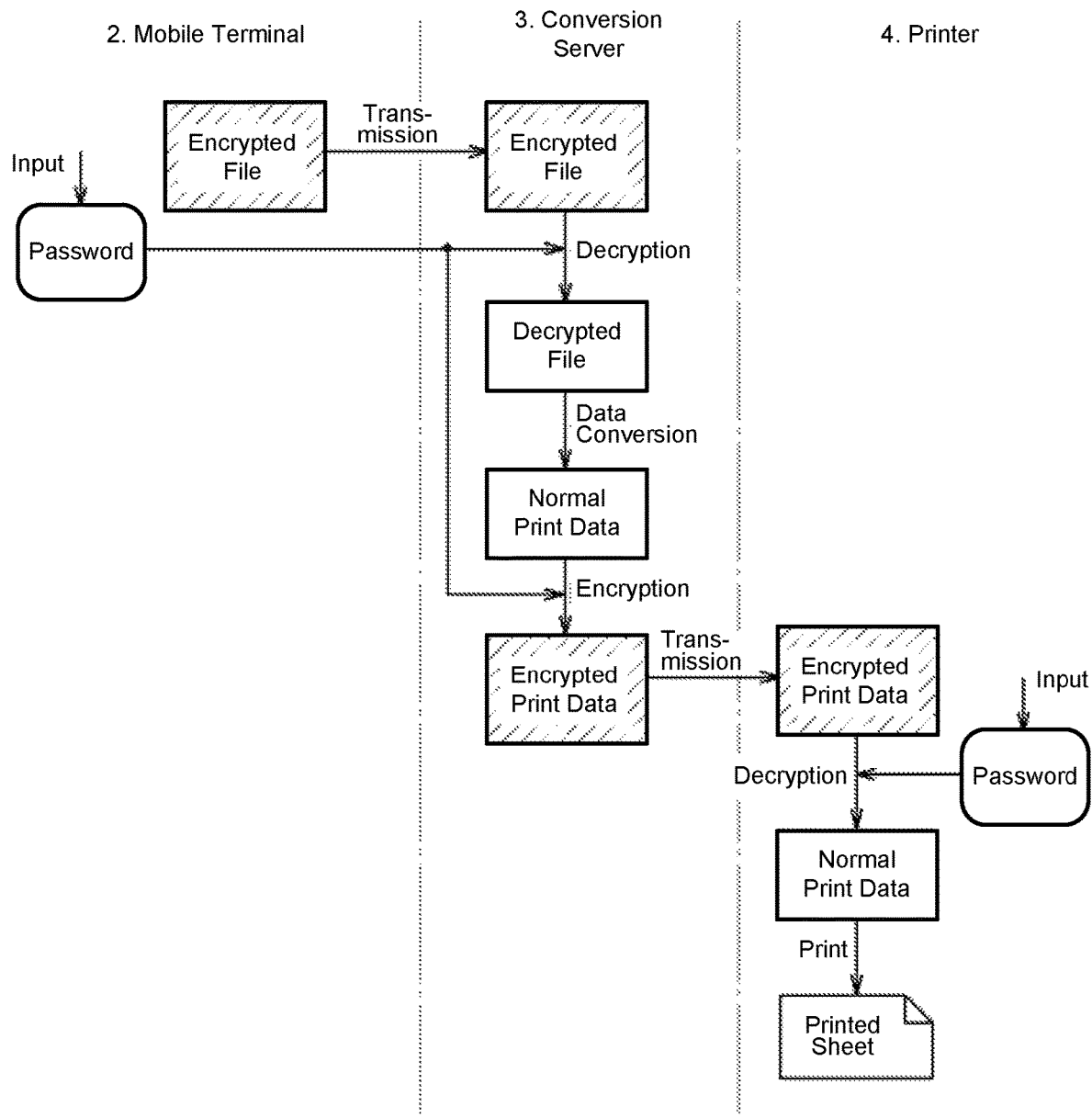
FIG. 7 is a schematic diagram illustrating flow of various kinds of data in the first embodiment.

Further, after print processing based on print data (that is, a job) is performed, the printer 4 deletes the print data from the data storage part 32 (FIG. 5, the step SP44, and FIG. 6, the step SP58). As a result, in the print system 1, unnecessary files do not remain in the data storage part 32 of the printer 4, storage capacity of the data storage part 32 can be kept to a necessary minimum, and the job can be prevented from being carelessly referenced or printed even when a third party illegally attempts to reference or print the job by operating the display operation part 34.

Further, in the print system 1, in the case where an encrypted file is printed, both when the file is transmitted from the mobile terminal 2 to the conversion server 3 and when the print data is transmitted from the conversion server 3 to the printer 4, the transmission is performed via the network 5 in a state in which the file or the print data is encrypted. Therefore, in the print system 1, even when packets and the like transmitted over the network 5 are intercepted by a third party, the possibility that the content of the encrypted file is viewed by the third party is extremely low.

In particular, in the conversion server 3, when the print data is encrypted, the password set for the encrypted file is used as it is to perform the re-encryption (FIG. 3, step SP18). Therefore, in the print system 1, when a user inputs a printer password in the printer 4, the user may input a password that is the same as the terminal password input in the mobile terminal 2, and there is no need to force a complicated operation such as requiring the user to use multiple types of passwords differently.

Further, when a print instruction of a file is received from a user, the mobile terminal 2 transmits the file to the conversion server 3 regardless of whether the file is a normal file or an encrypted file. When a received file is an encrypted file, the conversion server 3 transmits a password request to the mobile terminal 2 to have the user input a terminal password, and acquires the terminal password.

That is, in the print system 1, in the mobile terminal 2, there is no need to perform processing to determine whether a file for which a print instruction has been received is a normal file or an encrypted file or to perform processing to convert the file into print data, and further, there is also no need to prepare and execute an application to open an encrypted file. Therefore, in the print system 1, the mobile terminal 2 only needs to be able to execute relatively simple processing related to user interfaces such as file selection or password input by a user, and thus, the mobile terminal 2 can have a simple configuration.

According to the above configuration, in the print system 1 according to the first embodiment, when printing of an encrypted file is instructed, using a terminal password input by a user in the mobile terminal 2, the conversion server 3 performs decryption processing, data conversion processing and encryption processing to generate encrypted print data and transmit the encrypted print data to the printer 4. When a printer password is input by an operation of a user, the printer 4 decrypts the encrypted print data into normal print data, and then performs print processing. As a result, in the print system 1, print processing is started in a state in which it is ensured that the user is in an immediate vicinity of the printer 4, and thus, the printed sheet on which the content of the encrypted file has been printed can be immediately collected by the user, and the confidentiality of the encrypted file can be reliably maintained.

2. Second Embodiment

As compared to the print system 1 according to the first embodiment, a print system 101 (FIG. 1) according to a second embodiment is different in that, instead of the conversion server 3 and the printer 4, a conversion server 103 and a printer 104 are provided, but is configured in the same way with regard to the mobile terminal 2 and the network 5.

As compared to the conversion server 3 according to the first embodiment, the conversion server 103 is different in that, instead of the control part 21, a control part 121 is provided, but is configured in the same way with regard to the other parts. Similar to the control part 21 according to the first embodiment, the control part 121 has a CPU, a ROM, a RAM, and the like which are not illustrated in the drawings, and integrally controls the conversion server 103 by executing various programs.

As compared to the printer 4 according to the first embodiment, the printer 104 is different in that, instead of the control part 31, a control part 131 is provided, but is configured in the same way with regard to the other parts. Similar to the control part 31 according to the first embodiment, the control part 131 has a CPU, a ROM, a RAM, and the like which are not illustrated in the drawings, and integrally controls the printer 104 by executing various programs.

[2-1. Printing of File]

In the print system 101, by procedures partially different from those of the print system 1 according to the first embodiment, while decryption processing and encryption processing of a file stored in the mobile terminal 2 are appropriately performed, the file is converted into print data in the conversion server 103 and print processing is performed in the printer 104 based on the print data.

That is, in the print system 101, the mobile terminal 2 executes the print start processing procedure RT1 (FIG. 2) in the same way as in the first embodiment. On the other hand, in the print system 101, the conversion server 103 executes a file reception processing procedure RT11 (FIG. 12) instead of the conversion processing procedure RT2 (FIG. 3), and the printer 104 executes a print data reception processing procedure RT12 (FIG. 13) instead of the print data reception processing procedure RT4 (FIG. 5).

Figure 14:
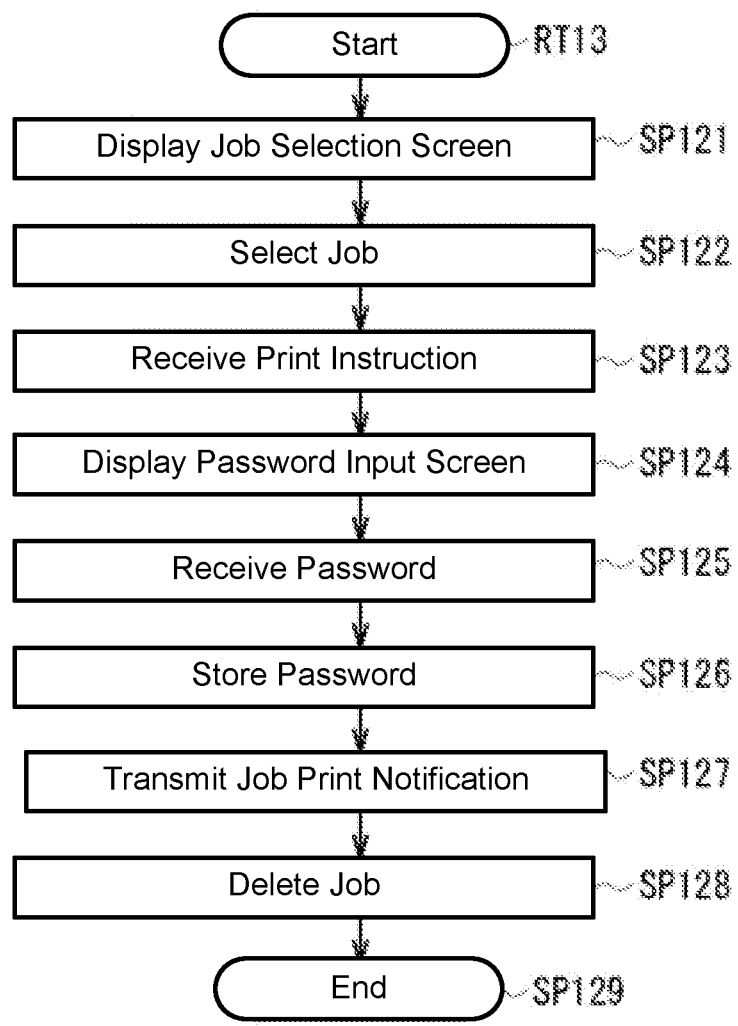
FIG. 14 is a flow diagram illustrating an authentication print processing procedure according to the second embodiment.
Figure 15:
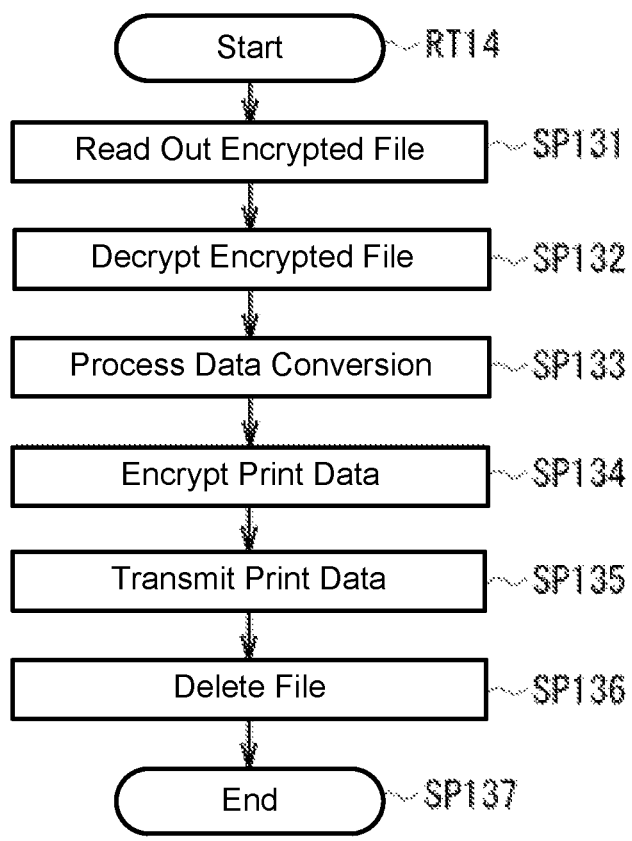
FIG. 15 is a flow diagram illustrating a decryption conversion processing procedure according to the second embodiment.

Further, in the print system 101, the printer 104 executes an authentication print start processing procedure RT13 (FIG. 14) instead of the authentication print processing procedure RT5 (FIG. 6), and, in response to this, the conversion server 103 executes a decryption conversion processing procedure RT14 (FIG. 15). Further, FIG. 16, which corresponds to FIG. 7, schematically illustrates flow of various kinds of data (that is, a file, print data, and the like) in a case of an encrypted file in the print system 101.

[2-2. File Reception Processing]

First, the file reception processing procedure RT11 (FIG. 12) executed in the conversion server 103 (FIG. 1) is described. Similar to the first embodiment, the control part 121 of the conversion server 103 (FIG. 1) is activated in advance and then executes a predetermined standby program, and thereby, uses the communication part 23 to wait for a file transmitted from the mobile terminal 2.

When a file is received from the mobile terminal 2, the control part 121 reads out a file reception program from the data storage part 22 and executes the file reception program, and thereby, forms therein the data analysis part 25 (FIG. 1) and then starts the file reception processing procedure RT11 (FIG. 12) and proceeds to a first step SP101.

The control part 121 respectively performs the same processings as the steps SP11, SP12, SP13, SP20, SP21 and SP22 of the conversion processing procedure RT2 (FIG. 3) in steps SP101, SP102, SP103, SP104, SP105 and SP108. That is, when a received file is a normal file, the control part 121 converts the file into print data and transmits the print data to the printer 104.

On the other hand, when a positive result is obtained in the step SP102, that is, when the received file is an encrypted file, the control part 121 proceeds to a next step SP106. In the step SP106, the control part 121 generates a job addition notification and transmits the job addition notification to the printer 104, and then proceeds to a step SP107.

The job addition notification as notification data is for notifying the printer 104 that the conversion server 103 has received from the mobile terminal 2 an encrypted file has stored the encrypted file in the data storage part 22. The job addition notification includes information about the encrypted file such as a file name, and information related to the user of the mobile terminal 2.

In the step SP107, the control part 121 performs processing similar to the step SP19 of the conversion processing procedure RT2 (FIG. 3), uses the communication part 23 (FIG. 1) to transmit the job notification to the mobile terminal 2 and proceeds to the next step SP108 to terminate the file reception processing procedure RT11.

In response to this, when the job notification is received, the mobile terminal 2 displays a predetermined job notification screen on the display operation part 14, and thereby, allows the user to recognize that it is necessary to start print processing by operating the printer 104 to instruct printing.

In this way, when an encrypted file is received from the mobile terminal 2, the control part 121 stores the encrypted file in the data storage part 22 without converting the encrypted file, and notifies the printer 104 that the encrypted file has been stored by transmitting the job addition notification to the printer 104.

[2-3. Print Data Reception Processing]

Figure 13:
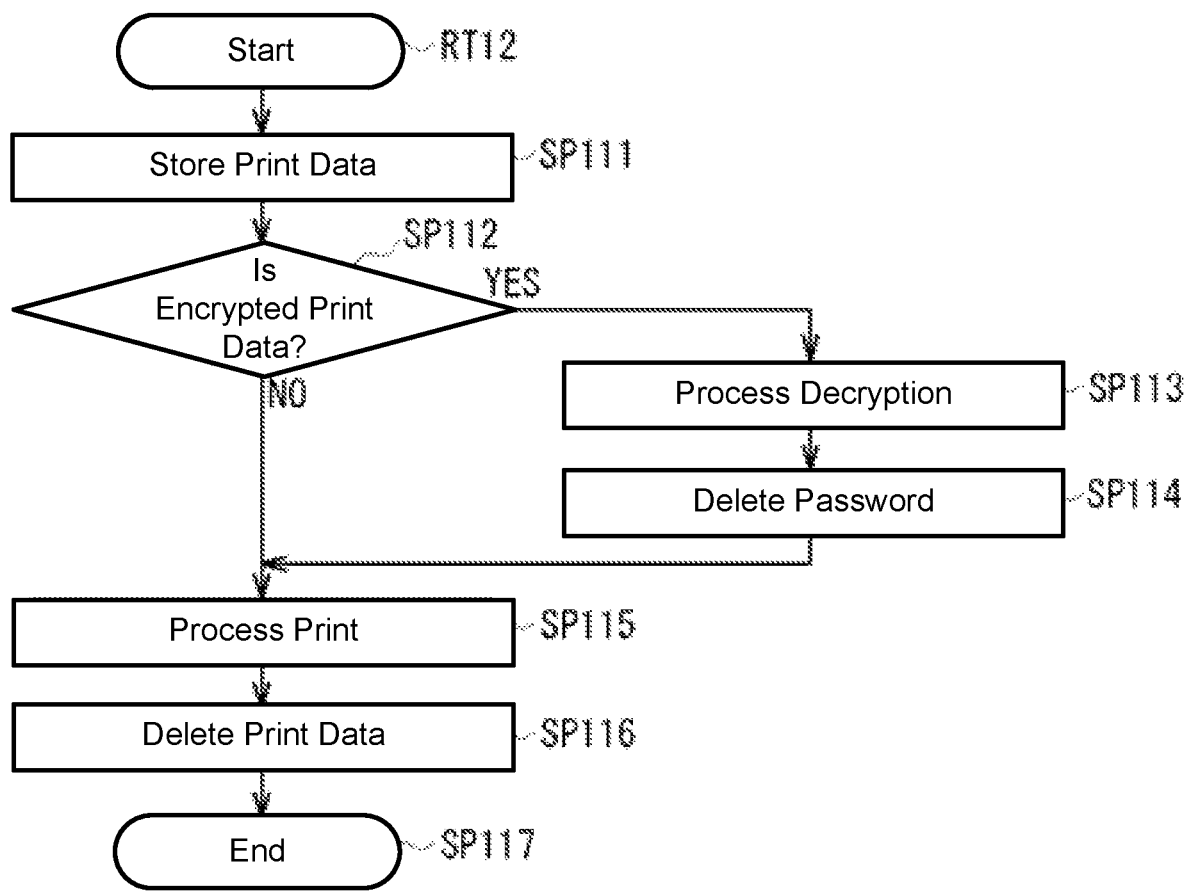
FIG. 13 is a flow diagram illustrating a print data reception processing procedure according to the second embodiment.

Next, the print data reception processing procedure RT12 executed in the printer 104 (FIG. 1) is described with reference to the flow diagram of FIG. 13. Similar to the first embodiment, the control part 131 of the printer 104 (FIG. 1) is activated in advance and then executes a predetermined standby program, and thereby, uses the communication part 33 to wait for print data or the like (that is, print data or a job addition notification) transmitted from the conversion server 103.

When print data or the like is received from the conversion server 103, the control part 131 reads out a print data receiving program from the data storage part 32 and executes the print data receiving program, and thereby forms therein the data analysis part 37 (FIG. 1) and starts the print data reception processing procedure RT12 (FIG. 13) and proceeds to a first step SP111.

Similar to the step SP41 (FIG. 5), in the step SP111, the control part 131 stores the received print data or the like, that is, print data or a job addition notification, in the data storage part 32 (FIG. 1), and proceeds to a next step SP112. In this case, when encrypted print data is received (details will be described later), the control part 131 also stores the encrypted print data in the data storage part 32.

After that, the control part 131 respectively performs the same processings as the steps SP42, SP43, SP44 and SP45 of the print data reception processing procedure RT4 (FIG. 5) in steps SP112, SP115, SP116 and SP117, and terminates the print data reception processing procedure RT12. However, when a positive result is obtained in the step SP112, that is, when encrypted print data has been received, the control part 131 executes processing of a step SP113 and a step SP114 to be described later.

In this way, when normal print data is received, the control part 131 immediately executes print processing. On the other hand, when a job addition notification is received, the control part 131 stores the job addition notification in the data storage part 32.

[2-4. Authentication Print Start Processing]

Next, the authentication print start processing procedure RT13 executed in the printer 104 (FIG. 1) is described with reference to the flow diagram of FIG. 14. In the second embodiment, a file (actually, encrypted print data stored in the conversion server 103) associated with a job addition notification stored in the data storage part 32 of the printer 104 is referred to as a job.

Similar to the first embodiment, the control part 131 of the printer 104 (FIG. 1) is activated in advance and then executes a predetermined standby program, and thereby, waits for an operation instruction from a user via the display operation part 34. When a start operation of authentication print processing is performed by performing a predetermined input operation with respect to the display operation part 34 by a user in an immediate vicinity of the printer 104, the control part 131 reads out an authentication print start program from the data storage part 32 and executes the authentication print start program, and thereby, starts the authentication print start processing procedure RT13 (FIG. 14), and proceeds to a first step SP121.

The control part 131 respectively performs the same processings as the steps SP51, SP52, SP53, SP54 and SP55 of the authentication print processing procedure RT5 (FIG. 6) in steps SP121, SP122, SP123, SP124 and SP125. That is, the control part 131 displays the job selection screen D3 (FIG. 10) on the touch panel of the display operation part 34 to allow the user to perform a selection and further to allow the user to input a printer password, and then proceeds to a next step SP126.

However, although the control part 131 displays the job selection screen D3 (FIG. 10) on the touch panel of the display operation part 34 in the step SP121 in the same manner as in the first embodiment, in this case, the job icons ICJ displayed in the job icon arrangement area AR3 respectively correspond to job addition notifications stored in the data storage part 32.

In the step SP126, the control part 131 stores the printer password input by the user in the data storage part 32, and proceeds to a next step SP127. In the step SP127, the control part 131 generates a job print notification indicating that the job corresponding to the job icon ICJ selected by the user in the steps SP122 and SP123 and transmits the job print notification to the conversion server 103, and proceeds to a next step SP128. The job print notification includes information for identifying the encrypted file such as a file name of the encrypted file stored in the job addition notification and the password input by the user.

In the step SP128, the control part 131 deletes the selected job, that is, the job addition notification stored in the data storage part 32, and then proceeds to a next step SP129 to terminate the authentication print start processing procedure RT13.

[2-5. Decryption Conversion Processing and Print Data Reception Processing]

Next, the decryption conversion processing procedure RT14 executed in the conversion server 103 (FIG. 1) and a part of the above-described print data reception processing procedure RT12 are described. The control part 121 of the conversion server 103 (FIG. 1) is activated in advance and then executes a predetermined standby program, and thereby, uses the communication part 23 to wait for a job print notification transmitted from the printer 104.

When a job print notification is received from the printer 104, the control part 121 reads out a conversion program from the data storage part 22 and executes the conversion program, and thereby, forms therein functional blocks such as the data conversion part 26, the data decryption part 27 and the data encryption part 28, and then starts the decryption conversion processing procedure RT14 (FIG. 15) and proceeds to a first step SP131. In the step SP131, the control part 131 reads out the encrypted file corresponding to the file name stored in the job print notification from the data storage part 22, and proceeds to a next step SP132.

Figure 16:
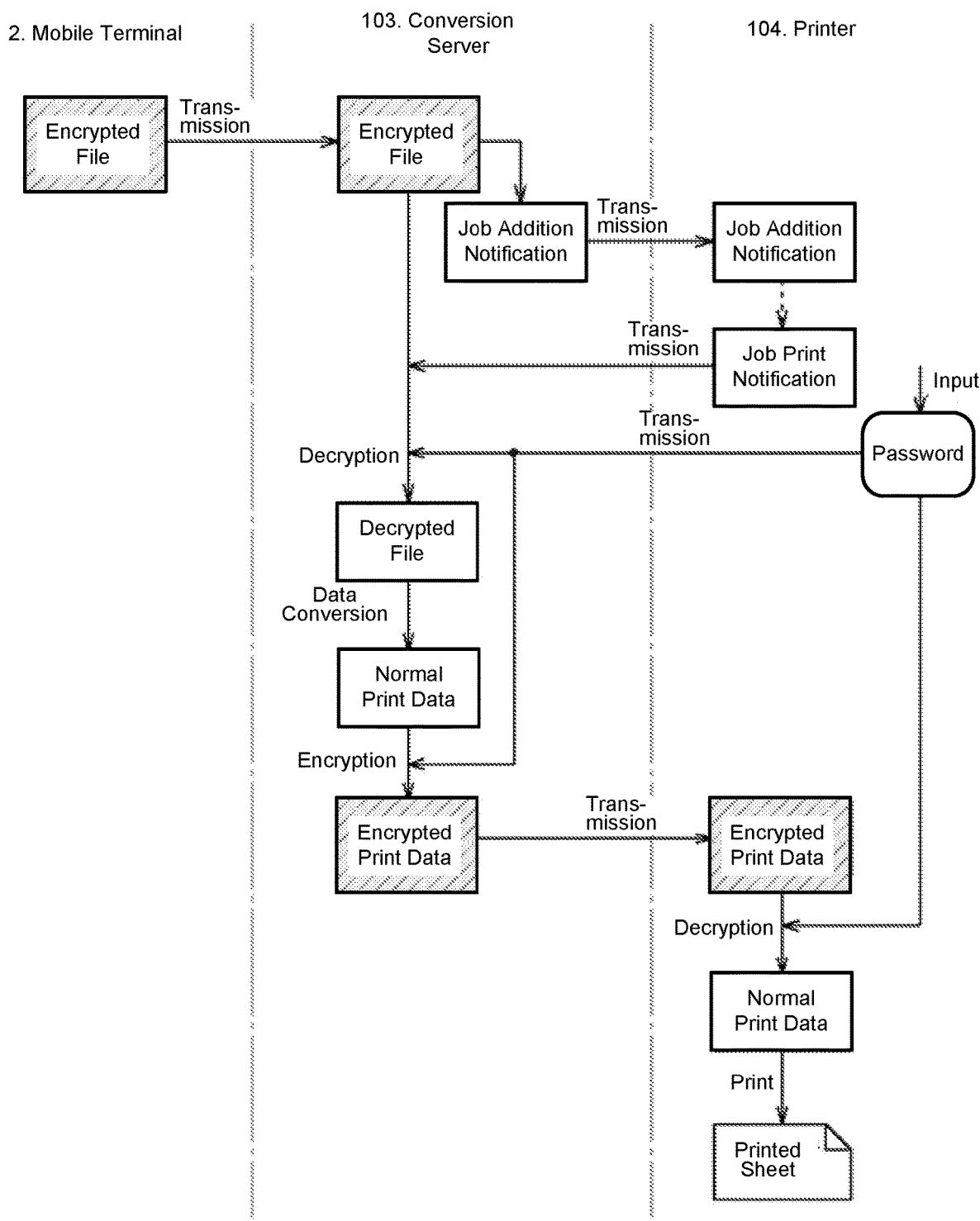
FIG. 16 is a schematic diagram illustrating flow of various kinds of data in the second embodiment.

The control part 131 respectively performs the processings as the steps SP16, SP17, SP18, SP20, SP21 and SP22 of the conversion processing procedure RT2 (FIG. 3) in steps SP132, SP133, SP134, SP135, SP136 and SP137, and terminates the decryption conversion processing procedure RT14 (FIG. 15). That is, as illustrated in FIG. 16, the control part 131 generates encrypted print data by sequentially going through decryption processing, data conversion processing and encryption processing, and transmits the encrypted print data to the printer 104.

In response to this, the control part 131 of the printer 104 (FIG. 1) executes again the above-described print data reception processing procedure RT12 (FIG. 13), and, when a positive result is obtained in the step SP112, proceeds to the next step SP113. In the step SP113, similar to the step SP56 of the authentication print processing procedure RT5 (FIG. 6), the control part 131 uses the data decryption part 38 (FIG. 1) to decrypt the encrypted print data using the printer password stored in the data storage part 32 and thereby converts the encrypted print data into normal print data, and proceeds to the next step SP114. In the step SP114, the control part 131 deletes the printer password stored in the data storage part 32, and proceeds to the next step SP115.

After that, similar to the case where normal print data is printed, the control part 131 performs print processing by performing processings of the steps SP115, SP116 and SP117, and then terminates the print data reception processing procedure RT12.

[2-6. Effects and the Like]

In the above-described configuration, in the print system 101 according to the second embodiment, when printing of a normal file is instructed in the mobile terminal 2, the normal file is converted into print data in the conversion server 103, and print processing based on the print data is performed in the printer 104.

On the other hand, in the print system 101, when printing of an encrypted file is instructed in the mobile terminal 2, as illustrated in FIG. 16, the encrypted file is transmitted to the conversion server 103. The conversion server 103 stores the encrypted file as it is, and generates a job addition notification and transmits the job addition notification to the printer 104.

When a job (job addition notification) is selected and a printer password is input by operations of the user, the printer 104 generates a job print notification and transmits the job print notification to the conversion server 103. The conversion server 103 decrypts the encrypted file using the printer password included in the job print notification and converts the decrypted file into print data, and then further encrypts the print data into encrypted print data and transmits the encrypted print data to the printer 104. The printer 104 decrypts the encrypted print data into normal print data using the stored printer password, and then performs print processing.

That is, in the print system 101, similar to the first embodiment, when a print instruction of an encrypted file is received in the mobile terminal 2, the user is positioned in an immediate vicinity of the printer 104, and print processing is not started until a printer password is input by operating the display operation part 34, and print processing is started after the printer password is input. Therefore, in the print system 101, similar to the first embodiment, a printed sheet on which content of an encrypted file requiring confidentiality has been printed can be immediately collected by a user who has input a valid password, and thus, there is no risk that the printed sheet is viewed by a third party, and the confidentiality of the encrypted file can be reliably maintained.

Further, in the print system 101, a printer password is input in the printer 104 by a user, and decryption processing is performed using the printer password and then data conversion processing is performed in the conversion server 103. As a result, in the print system 101, different from the first embodiment, there is no need for a user to input a terminal password in the mobile terminal 2, and thus, the number of times that the user is required to input a password can be reduced to 1, that is, time and effort of the user can be reduced.

Figure 12:
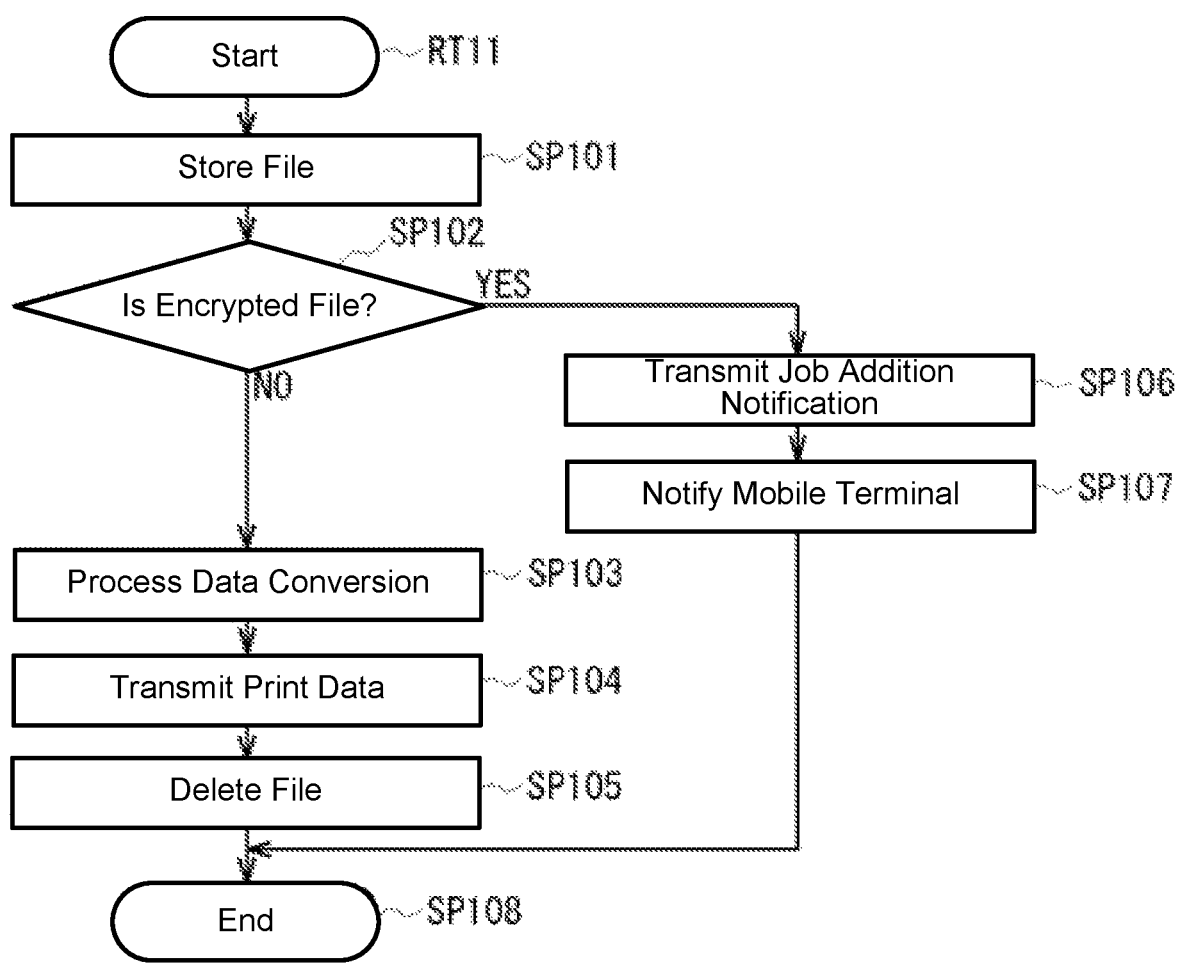
FIG. 12 is a flow diagram illustrating a file reception processing procedure according to a second embodiment.

Further, when an encrypted file is received from the mobile terminal 2 and is stored in the data storage part 22, the conversion server 103 transmits a job notification to the mobile terminal 2 (FIG. 12, the step SP107). As a result, in the print system 101, the user who wants to print the encrypted file can recognize that processing for printing is in progress and that the user is required to input a password in the printer 104.

Also in other aspects, the print system 101 can achieve the same operation effects as the print system 1 according to the first embodiment.

According to the above configuration, in the print system 101 according to the second embodiment, when printing of an encrypted file is instructed, the encrypted file is stored in the conversion server 103 and a job addition notification is transmitted to the printer 104. When a job is selected and a printer password is input by operations of a user, the printer 104 transmits this (the input password) to the conversion server 103, and encrypted print data generated in the conversion server 103 by performing decryption of the encrypted file, conversion into print data and encryption is obtained, and the encrypted print data is decrypted into normal print data and then print processing is performed. As a result, in the print system 101, print processing is started in a state in which it is ensured that the user is in an immediate vicinity of the printer 104, and thus, the printed sheet on which the content of the encrypted file has been printed can be immediately collected by the user, and the confidentiality of the encrypted file can be reliably maintained.

3. Other Embodiments

In the above-described first embodiment, the case is described where a printer password is input in the printer 4 by a user (FIG. 6, the step SP55). However, the present invention is not limited to this. For example, it is also possible to have the user log on by inputting a user name and a logon password when the user operates with respect to the mobile terminal 2, and to also transmit user information including the user name and the like when a file is transmitted to the conversion server 3. In this case, it is also possible to have the user log on to the printer 4 by inputting a user name and logon password, and have the user select a job and input a printer password, and to perform printing only when both the printer password and the user name are authenticated. Further, in this case, it is also possible that only jobs of the logged-on user are displayed in the job selection screen D3 (FIG. 10). The same also applies to the second embodiment.

Further, in the above-described first embodiment, the case is described where, when the print data is encrypted in the conversion server 3, the encryption is performed using the same password as the password of the encrypted file (FIG. 3, the step SP18). However, the present invention is not limited to this. It is also possible that the print data is encrypted using another password different from the password of the encrypted file. For example, a password predetermined by the user is stored in at least one of the conversion server 3 and the printer 4, and this password is used. Or, the print data may be encrypted using a password that is for the user to log on to the printer 4. In this case, when the user selects a job after the user has logged on to the printer 4 by inputting a password, the password input at logon may be used without having the user input a password again.

Or, for example, in the first embodiment, when the normal data is encrypted in the conversion server 3, it is also possible to perform encryption using identification information uniquely set with respect to the mobile terminal 2 such as a MAC (Media Access Control) address set to the communication part 13 of the mobile terminal 2. In this case, the mobile terminal 2 can transmit the identification information together with the encrypted file to the conversion server 3. Further, in this case, for example, the printer 4 can decrypt the encrypted print data by acquiring the identification information from the mobile terminal 2 by performing communication processing via the wireless LAN between the communication part 33 as an identification information acquisition part and the communication part 13 of the mobile terminal 2. Further, in this case, it is also possible that the communication part 33 of the printer 4 and the communication part 13 of the mobile terminal 2 are provided with a near field communication (NFC) function and the identification information is passed using the near field communication between the communication part 33 and the communication part 13. The same also applies to the second embodiment.

Further, these may be appropriately combined. For example, in the first embodiment, it is also possible that the print data generated in the conversion server 3 is not encrypted and is transmitted from the conversion server 3 to the printer 4 in a state of being associated with the user name. In this case, the printer 4 can store the print data associated with the user name as a job, and, when the user has logged on by inputting a password, display the job to allow the user to select, and then perform print processing.

Further, in the above-described first embodiment, the case is described where, when normal print data is received from the conversion server 3, the printer 4 immediately performs print processing, whereas when encrypted print data is received, the printer 4 does not immediately print the encrypted print data, but performs decryption processing and then print processing after a password has been input by the user (FIGS. 6 and 7 and the like). However, the present invention is not limited to this. For example, instead of encrypting the print data in the conversion server 3, the print data may be transmitted to the printer 4 by adding predetermined restriction information such as "confidential printing specified." In this case, it is also possible that the printer 4 stores the print data added with restriction information in the data storage part 32 without immediately starting print processing, and, for example, when an instruction to start printing is received from the user via the display operation part 34, the printer 4 converts the print data with added restriction information to normal print data by deleting the restriction information and starts print processing. As a result, the print system 1 can realize so-called "confidential printing" in which the user who has instructed the printing of a file immediately receives the printed sheet in the printer 4, thereby preventing the content from being viewed or the sheet from being taken by others. In other words, in the print system 1, it is also possible that a file is converted by the data conversion part 26 of the conversion server 3 into data (hereinafter, referred to as restricted data) for which the start of print processing in the printer 4 is restricted, and the print processing is executed by releasing the restriction of the restricted data by the data decryption part 38 of the printer 4. Further, it is not limited to the case where the original file is an encrypted file. For example, when a print instruction of a normal file is received in the print application 16 (FIG. 1), when an instruction to print is received from the user, restriction information may be similarly added in the conversion server 3.

Further, in the above-described first embodiment, the case is described where, after the encrypted print data is generated in the conversion server 3, the encrypted print data is transmitted to the printer 4 and thereby is stored in the data storage part 32 of the printer 4 (FIG. 1). However, the present invention is not limited to this. For example, it is also possible that, after encrypted print data is generated in the conversion server 3, the encrypted print data is stored in the data storage part 22 of the conversion server 3, and a job addition notification similar to that of the second embodiment is transmitted to the printer 4. In this case, after a job is selected and a password is input in the printer 4, the encrypted print data corresponding to the selected job may be transmitted from the conversion server 3 to the printer 4. As a result, it is not necessary to store the encrypted print data in the data storage part 32 of the printer 4, and thus, the storage capacity of the data storage part 32 can be reduced.

Further, in the above-described first embodiment, the case is described where, after print processing based on print data is performed, the printer 4 immediately deletes the print data from the data storage part 32 (FIG. 5, the step SP44, and FIG. 6, the step SP58). However, the present invention is not limited to this. For example, it is also possible that the print data is deleted after a predetermined time period (for example, three days, one week, or the like) has passed since the execution of the print processing, or the print data is deleted only when the user has performed a predetermined deletion operation. As a result, when the user wants to print the same file again, the printer 4 does not need to have the user operate the mobile terminal 2, and operation simplification can be achieved. The same also applies to the data storage part 32 of the printer 4. Further, the same also applies to the data storage part 22 of the conversion server 103 and the data storage part 32 of the printer 104 in the second embodiment.

Further, in the above-described first embodiment, the case is described where, when conversion processing of an encrypted file has been completed in the conversion server 3 and encrypted print data has been transmitted to the printer 4, a data conversion notification is transmitted to the mobile terminal 2, and thereby, the user is informed that processing related to printing of the encrypted file is in progress However, the present invention is not limited to this. For example, transmission of the data conversion notification to the mobile terminal 2 may be omitted. The same also applies to the second embodiment.

Further, in the above-described second embodiment, the case is described where, when print data is transmitted from the conversion server 103 to the printer 104, the print data is transmitted as encrypted print data obtained by encryption processing (FIG. 15, the step SP134). However, the present invention is not limited to this. For example, the print data may be transmitted without being encrypted. As a result, processing loads of encryption processing and decryption processing in the conversion server 103 and the printer 104 can be reduced.

Further, in the above-described first embodiment, the case is described where the conversion server 3 has the functional blocks such the the data analysis part 25, the data conversion part 26, the data decryption part 27 and the data encryption part 28 (FIG. 1), and performs processings such as data conversion processing of converting a file into print data, decryption processing and encryption processing. However, the present invention is not limited to this. For example, it is also possible that some of the functions of the conversion server 3 such as that of the data analysis part 25 are included in the control part 11 of the mobile terminal 2 and some of the processings are executed in the mobile terminal 2. Further, all the functions of the conversion server 3 may be included in the control part 11 of the mobile terminal 2. In this case, the conversion server 3 can be omitted from the print system 1. The same also applies to the second embodiment.

Further, in the above-described first embodiment, the case is described where a file stored in the data storage part 12 of the mobile terminal 2 is printed using the printer 4. However, the present invention is not limited to this. For example, by operating the mobile terminal 2, the user may print a file stored in another server connected to the network 5 using the printer 4. The same also applies to the second embodiment.

Further, in the above-described first embodiment, the case is described where printing of a file is performed by receiving an operation of a user in the mobile terminal 2 which is a smartphone. However, the present invention is not limited to this. For example, an operation of a user may be received in a mobile terminal 2 which can be various information processing devices such as a tablet terminal and a notebook computer. Or, an operation of a user may be received by connecting a stationary computer device instead of a portable mobile terminal 2 to the network 5. The same also applies to the second embodiment.

Further, in the above-described first embodiment, the case is described where a file is printed using the printer 4 that has a single function, that is, only a print function and does not have a copy function or a facsimile function. However, the present invention is not limited to this. For example, a file may be printed using a printer that is a so-called multi function printer (MFP) having a copy function, a facsimile transmission and reception function and the like in addition to a print function. The same also applies to the second embodiment.

Further, the present invention is not limited to the above-described embodiments and other embodiments. That is, the application scope of the present invention also covers embodiments obtained by arbitrarily combining some or all of the above-described embodiments and the above-described other embodiments, and embodiments obtained by extracting some of the above-described embodiments and other embodiments.

Further, in the above-described first embodiment, the case is described where the print system 1 as a print system is configured to include the mobile terminal 2 as a terminal device, and the printer 4 as an image forming device. Further, the case is described where the print system is configured to include the display operation part 14 as a first receiving part, the data decryption part 27 as a decryption part, the data conversion part 26 as a restriction setting part, the data decryption part 38 as a restriction releasing part, and the image forming part 35 as a print part. However, the present invention is not limited to this. A print system may be configured to include a terminal device and an image forming device of various other kinds of configurations, and the print system may be configured to include a first receiving part, a decryption part, a restriction setting part, a restriction releasing part, and a print part.

INDUSTRIAL APPLICABILITY

The present invention can be used, for example, in a print system in which a file stored in a mobile terminal is printed using a printer.

What is claimed is:
1. A print method for using an image forming device to print an encrypted file transmitted from a terminal device, the terminal device and the image forming device being connected to a server device via a predetermined network, the print method comprising:
    receiving a password of the encrypted file by the image forming device;

generating a job print notification with the received password included therein;

transmitting the job print notification from the image forming device to the server device;

generating normal data by decrypting the encrypted file stored in the server in advance of the job print notification using the password included in the received job print notification transmitted from the image forming device and converting the decrypted file into the normal data by the server device;

generating a re-encrypted file using the received password transmitted from the image forming device, by the server device, by re-encrypting the normal data, the re-encrypted file being set so as to restrict print processing;

based on an operation of a user with respect to the image forming device, generating the normal data by re-decrypting the re-encrypted file using the received password and converting the decrypted file into normal data by the image forming device; and printing the normal data using the image forming device.

2. A print system for using an image forming device to print an encrypted file transmitted from a terminal device, the terminal device and the image forming device being connected to a server device via a predetermined network, the print system comprising:

a first receiving part that receives a password of the encrypted file and generates a print job notification with the received password included therein, the first receiving part being included in the image forming device, the password being input by the user;

a decryption part that generates normal data by decrypting the encrypted file stored in the server in advance of the job print notification using the password included in the print job notification received from the first receiving part and converting the decrypted file into the normal data, the decryption part being included in the server device;

a restriction setting part that, based on the normal data, generates a re-encrypted file using the password received from the first receiving part, by the server device, by re-encrypting the normal data, the re-encrypted file being set so as to restrict print processing;

a restriction releasing part that, based on an operation of a user with respect to the image forming device, generates the normal data by re-decrypting the re-encrypted file using the received password and converting the decrypted file into normal data; and a print part that causes the image forming device to print the normal data.

3. The print system according to claim 2, wherein the first receiving part receives a logon password input by the user to log on to the image forming device;

the re-encryption part re-encrypts the normal data using the logon password, and the re-decryption part re-decrypts the re-encrypted file using the logon password.

4. The print system according to claim 2, wherein the terminal device includes a first transmission part that transmits the encrypted file to the server device, the server device includes:

a first reception part that receives the encrypted file;

a storage part that stores the encrypted file; and a second transmission part that transmits, to the image forming device, notification data notifying the image forming device of the encrypted file, the image forming device further includes;

a second reception part that receives the notification data; and a third transmission part that transmits the password, the server device includes:

a third reception part that receives the password;

the decryption part;

the re-encryption part; and a fourth transmission part that transmits the re-encrypted file to the image forming device, the image forming device further includes:

a fourth reception part that receives the re-encrypted file;

the re-decryption part; and the print part.

5. The print system according to claim 4, wherein the second transmission part transmits the notification data to the image forming device and transmits to the terminal device a notification prompting the user to operate with respect to the image forming device.

* * * * *